US012211469B2

(12) United States Patent
Trifilio

(10) Patent No.: US 12,211,469 B2
(45) Date of Patent: Jan. 28, 2025

(54) PLECTRUM STORAGE ORGANIZER AND DISPLAY APPARATUS

(71) Applicant: Chemistry Design Werks, LLC, Minneapolis, MN (US)

(72) Inventor: Christian Richard Trifilio, Saint Paul, MN (US)

(73) Assignee: Chemistry Design Werks, LLC, Minneapolis, MN (US)

( * ) Notice: Subject to any disclaimer, the term of this patent is extended or adjusted under 35 U.S.C. 154(b) by 0 days.

(21) Appl. No.: 18/514,775

(22) Filed: Nov. 20, 2023

(65) Prior Publication Data

US 2024/0428755 A1 Dec. 26, 2024

Related U.S. Application Data

(63) Continuation of application No. 18/236,829, filed on Aug. 22, 2023, now Pat. No. 11,837,203.

(60) Provisional application No. 63/522,312, filed on Jun. 21, 2023.

(51) Int. Cl.
*G10D 3/173* (2020.01)

(52) U.S. Cl.
CPC .................................. *G10D 3/173* (2020.02)

(58) Field of Classification Search
CPC ..................................................... G10D 3/173
See application file for complete search history.

(56) References Cited

U.S. PATENT DOCUMENTS

| | | | | |
|---|---|---|---|---|
| 4,890,531 A * | 1/1990 | Tischer | G10D 3/173 84/322 |
| 5,649,634 A * | 7/1997 | Irizarry | F16M 13/00 248/205.5 |
| 8,716,581 B1 * | 5/2014 | Boyd | G10D 3/173 84/329 |
| 11,837,203 B1 * | 12/2023 | Trifilio | G10D 3/173 |

* cited by examiner

*Primary Examiner* — Robert W Horn
(74) *Attorney, Agent, or Firm* — Campbell IP Law LLC

(57) ABSTRACT

An apparatus comprises a disc having a plurality of radially projecting slots, each slot configured to receive and hold a musical instrument pick. The disc may also comprise a protrusion configured to be pushed by a finger of a user of the apparatus to retrieve a pick from each of the slots in the disc.

20 Claims, 11 Drawing Sheets

PLECTRUM STORAGE ORGANIZER AND DISPLAY APPARATUS

CROSS-REFERENCE TO RELATED APPLICATIONS

This application is a continuation of U.S. Utility application Ser. No. 18/236,829 filed on Aug. 22, 2023 (which claims the benefit of U.S. Provisional Application No. 63/522,312 filed Jun. 21, 2023), the entire contents of these applications hereby incorporated by reference.

BACKGROUND

The present disclosure relates generally to plectra for stringed instruments, and more specifically, to apparatus and methods for storing, organizing and displaying plectra or picks.

Stringed musical instruments are commonly played with a plectrum, otherwise known as a pick. There are numerous kinds of picks to accommodate not only a variety of stringed instruments, but also a variety of string types and playing styles. It is common for musicians to use different kinds of picks, even on the same musical instrument, to achieve different playing techniques and tones. Picks generally have a triangular or teardrop shaped geometry, but are made with diverse materials and can vary in overall size, thickness, material type, degree of rigidity versus flexibility, surface texture, edge contours, tip sharpness, and aesthetics (e.g., color, logo, printed fonts, etc.), among other variables.

Due to their small size and thin profile, picks are notoriously easy to drop, misplace or lose. Further, they are difficult to keep in an organized manner for easy retrieval during playing. Accordingly, various systems and methods exist to try to overcome such issues. A common method is to place picks in individual pockets or sleeves that retain the picks by friction or positive retention force, such as disclosed by U.S. Pat. No. 4,785,708 by (Stevie Ray) Vaughan, entitled, “Pick holder for stringed instruments,” or U.S. Pat. No. 5,905,217 by Byers, entitled, “Pick holder.” Other methods include coil springs that can hold a plurality of picks, such as disclosed by U.S. Pat. No. 4,890,531 by Tischer, entitled “Musical instrument pick holder.” Additional methods utilize slots into which picks can be inserted, such as disclosed by U.S. Pat. No. 5,796,021 by Longshore, entitled “Pick holder for guitars and other stringed instruments,” or U.S. Pat. No. 6,215,052 by Giddens et al., entitled “Guitar pick holder.”

These existing systems and methods have numerous drawbacks. For example, because one hand is typically needed to keep hold of a stringed instrument, picks should be easily retrievable by the other hand by itself (i.e., one-handed), but this can be difficult when the retention force or friction of the holder is too high, or there is not enough room around the pick to retrieve it without obstacles. Further, the picks should be clearly organized and displayed so the musician can easily identify the particular pick they want to retrieve for playing, whereas many of these prior art methods largely hide or obscure the body of the pick. Additionally, these systems and methods typically focus on attaching the pick holder to either the instrument itself, or to the instrument strap, but many musicians do not want to alter their gear in such manner, and would prefer a portable stand-alone solution that can safely secure picks inside of a gig bag while also functioning well on a surface such as a table, top of an amplifier or other available surface within reach. Lastly, many music stores allow customers to borrow and try out various picks, but they are typically stored in a small bowl or ashtray on a countertop where they end up mixed together, and not conveniently displayed for easy identification and retrieval.

BRIEF SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, an apparatus for storing, organizing and displaying picks for a stringed musical instrument includes a disc having a top, bottom, center and a circumference, and a plurality of slots extending radially between the center and circumference. Each slot is configured to receive and securely hold a musical instrument pick through the top of the disc, and a protrusion at the center of the top of the disc is configured to be pushed by a finger of a user of the apparatus to retrieve a pick from each of the plurality of slots.

In another aspect, an apparatus for storing, organizing and displaying picks for a stringed musical instrument includes a disc having a top, bottom, center and a circumference; a plurality of slots extending radially between the center and circumference; and a base, wherein the disc is configured to rotate relative to the base. Each slot is configured to receive and securely hold a musical instrument pick through the top of the disc.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Disclosed herein is an improved apparatus and method for securely storing, organizing, and displaying plectra or musical instrument picks for easy visual identification and one-handed retrieval, as may be appreciated with regard to the following detailed description and reference to the Figures.

Figure 1A:
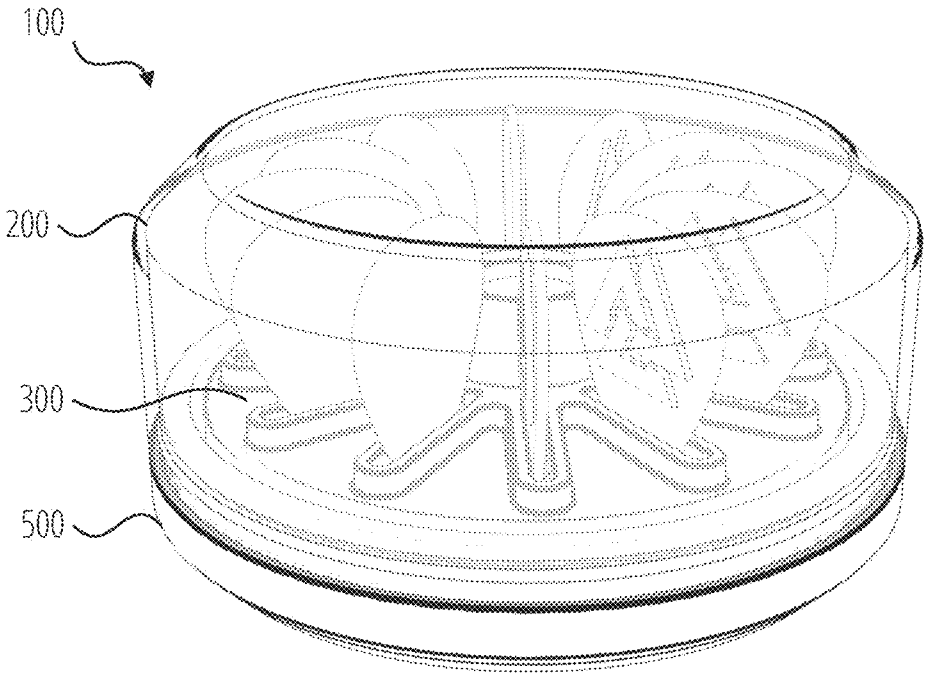
FIG. 1A is a top perspective view of an assembled apparatus according to an aspect of the present disclosure.

FIG. 1A is a top perspective view of an assembled apparatus 100, including lid 200 (shown as transparent), a disc 300, and a base 500.

Figure 1B:
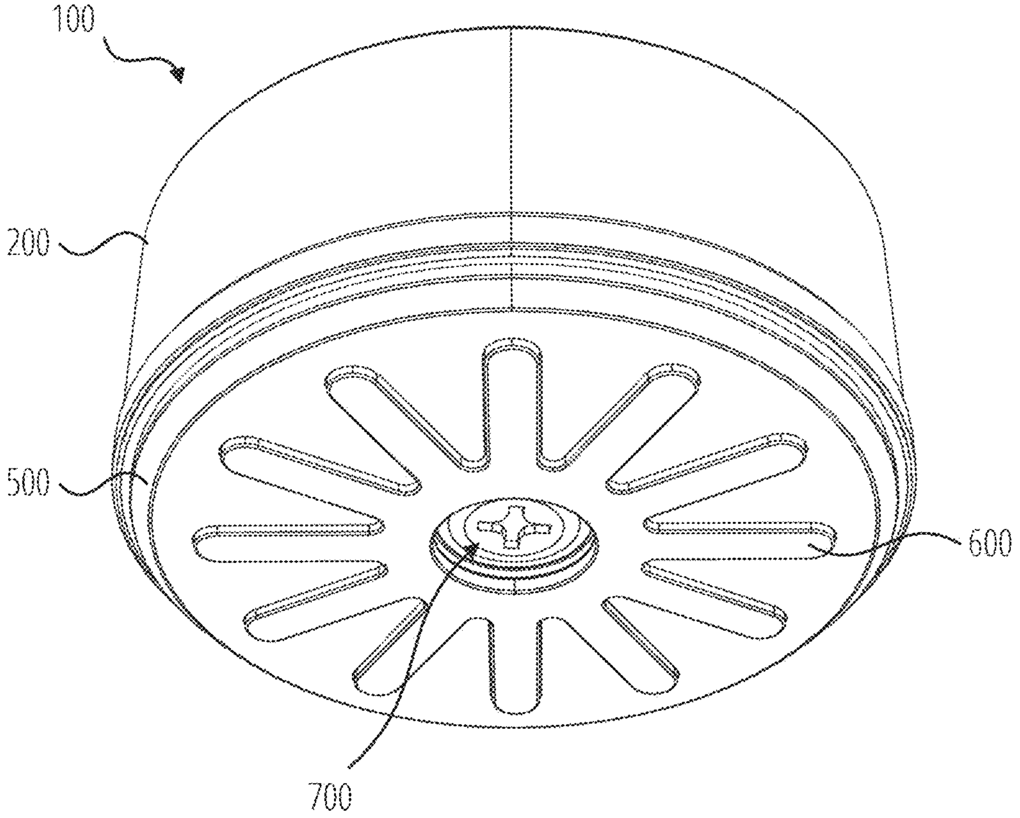
FIG. 1B is a bottom perspective view of an assembled apparatus according to an aspect of the present disclosure.

FIG. 1B is a bottom perspective view of the assembled apparatus 100 of FIG. 1A, further showing a foot 600 and a part of bearing subassembly 700.

As can be appreciated from FIG. 1A and FIG. 1B, lid 200 may snugly fit onto the top of base 500 to cover and secure the contents inside of the apparatus 100, namely, a plurality of picks organized and securely held within disc 300 (as discussed in further detail with reference to FIG. 3D and FIG. 8 among other Figures of the present disclosure). Foot 600 is attached to the underside of base 500, and both the base 500 and foot 600 have a central opening that is coaxially aligned to reveal a part of bearing subassembly 700. As assembled and with the lid 200 fit onto the base 500, apparatus 100 provides a secure system for storing, organizing and transporting a plurality of picks inside the apparatus 100 in a manner in which they will not fall out or be lost. In one aspect, lid 200 is shown as transparent in FIG. 1A such that apparatus 100 may be used as a display case, enabling easy visual identification of the picks stored inside. Lid 200 may comprise a clear polycarbonate, for example, to enable a strong but transparent structure.

Figure 2:
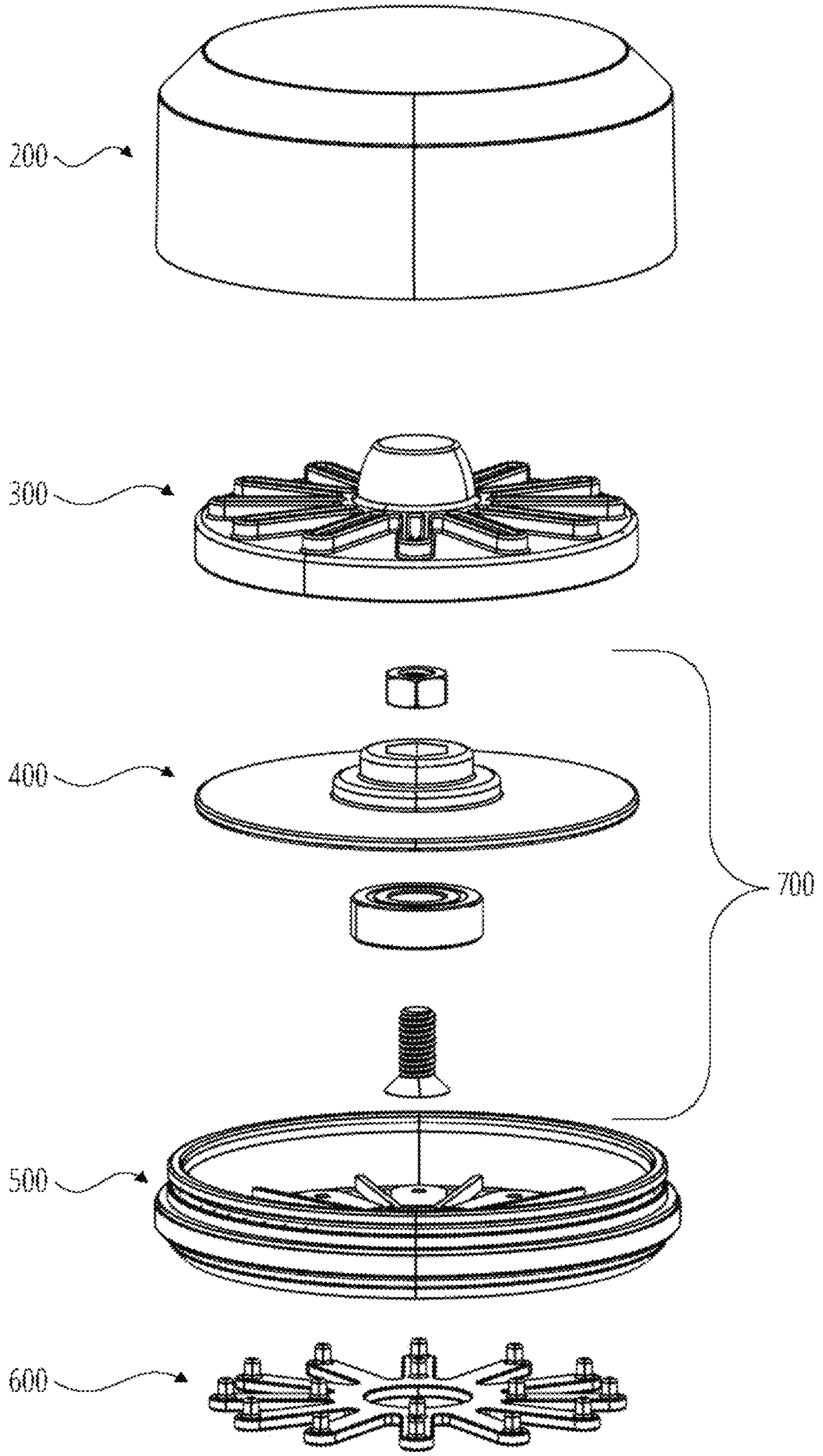
FIG. 2 is an exploded parts assembly view of an apparatus according to an aspect of the present disclosure, showing a lid, a disc for holding and organizing musical instrument picks, a tray, a base, a foot and a bearing subassembly.

FIG. 2 is an exploded parts assembly view of apparatus 100, showing the following components: lid 200, disc 300, tray 400, base 500, foot 600, and bearing subassembly 700 (which engages with but does not include tray 400). Generally, foot 600 is attached to the underside of base 500, and tray 400 is joined to base 500 via bearing subassembly 700 in a manner in which tray 400 is rotatable relative to base 500. Disc 300 is attached to the top of tray 400 such that it will also rotate along with tray 400 and relative to base 500. Lid 200 is secured to the top of base 500 to cover disc 300 and the other contents of apparatus 100, but may also be secured to the bottom of base 500 to act as a stand, as will be further described with reference to later Figures. Further details and features of each component of FIG. 2 and their means of assembly are provided with reference to each Figure and description provided below.

Figure 3A:
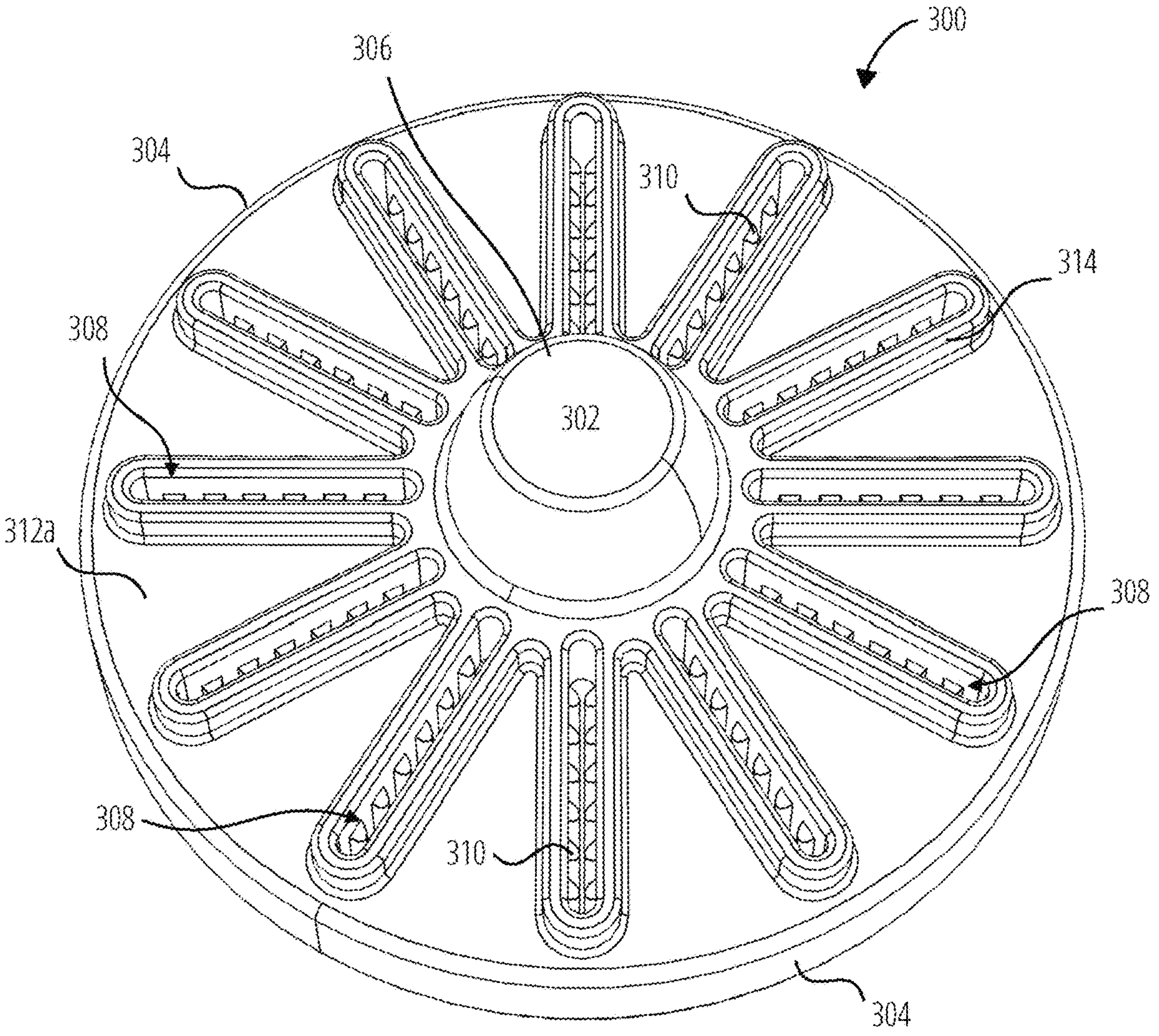
FIG. 3A is a top perspective view of a disc according to an aspect of the present disclosure.

FIG. 3A is a top perspective view of disc 300, showing disc center 302, circumference 304, protrusion 306, slots 308, pick retainers 310, top surface 312*a*, and flange 314. In one aspect, a plurality of slots 308 extends radially between the disc center 302 and circumference 304, each slot 308 configured to receive and securely hold a musical instrument pick 320 (shown in later Figures) through the top of disc 300 slots 308.

Each slot 308 may comprise grips within the slot 308, configured to apply pressure on a guitar pick and hold it in place via a retention force. Grips may comprise the inner opposing walls of slot 308 itself, particularly when disc 300 is made of a unitary construction and elastomer material having sufficient flexibility and friction to accommodate insertion, holding and retrieval of various pick sizes and geometries. However, in a preferred aspect as shown, grips further comprise pick retainers 310 which protrude from the inner opposing walls of each slot 308 in either opposing pairs or offset pairs and are designed to hold and accommodate a variety of picks as described further with reference to FIG. 3C and FIG. 3D below. Disc 300 preferably comprises an elastomer, including but not limited to rubber such as natural rubber, synthetic rubber, nitrile rubber, or silicone rubber, or thermoplastic elastomers (TPEs), or a combination thereof. In one aspect, disc 300 may comprise vulcanized rubber. When disc 300 comprises an elastomer or is made entirely of an elastomeric material, pick retainers 310 may preferably comprise the same elastomer as disc 300 to form a unitary construction.

Flange 314 is shown extending from top surface 312*a* and surrounding each slot 308, and can function to help guide the tip of each pick 320 into slots 308 until the pick engages with pick retainers 310 and is securely held, as well as to hold picks 320 straight up and down when the tapered end of a pick is inserted. Flange 314 may also function to provide more vertical space in each slot 308 for accommodating picks having varied overall dimensions, while enabling less material to be used in the overall construction of disc 300 between the radially projecting slots 308 to save on weight and cost.

Protrusion 306 rises from top surface 312*a* of disc 300 at the disc center 302, and is configured to be pushed by a finger of a user of apparatus 100 to retrieve a pick 320 from each slot 308, as described in further detail with reference to FIGS. 9A-9C below. The top of protrusion 306 forms an apex at the disc center 302 which may preferably comprise a planar apex or concave apex, such that a finger of the user may ergonomically press against the apex to gain leverage with their hand when pulling out a pick 320 from any of slots 308. Flanges 314 and protrusion 306 may also optionally comprise the same material as disc 300 to form a unitary construction, preferably an elastomer.

In a preferred aspect, slots 308 are equidistantly spaced, or in other words, extend at equal radial angles from the disc center 302 to the circumference 304. When the diameter of disc 300 is preferably about 80 centimeters to about 95 centimeters, more preferably about 70 centimeters to about 85 centimeters, then it was surprisingly discovered that having twelve slots 308 provided an ideal spacing to enable the average user to retrieve picks 320 with one hand 902 and without the adjacent picks 320 becoming an obstacle to retrieval. However, it may be appreciated that any number of slots may be provided in disc 300, and may be present in odd or even numbers, including at varying radial angles and spacings.

Figure 3B:
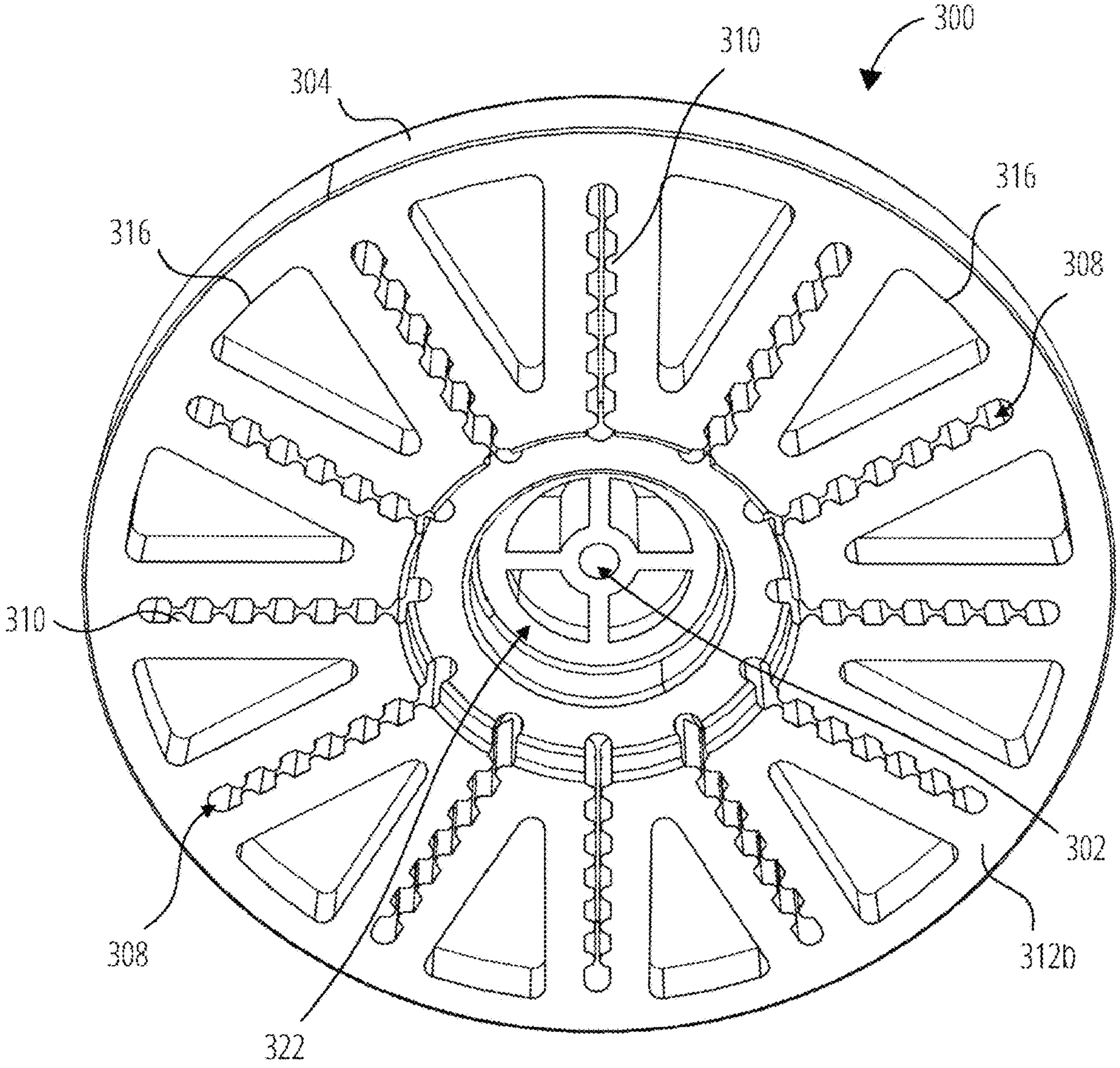
FIG. 3B is a bottom perspective view of a disc according to an aspect of the present disclosure.

FIG. 3B is a bottom perspective view of disc 300, showing disc center 302, circumference 304, slot 308, pick retainers 310, bottom surface 312*b*, voids 316, and disc cavity 322. Disc cavity 322 forms a stepped geometry configured to press-fit onto tray protrusion 406 shown with reference to FIG. 4A, however, other means of attachment may be utilized including adhesives. Slots 308 are shown extending all the way through from top surface 312*a* (in FIG. 3A) to bottom surface 312*b*, but may also be designed to extent partially from top surface 312*a*. When using slots 308 that extend all the way through, there is provided more vertical space to receive and retain picks having various tip sizes and characteristics, particularly in combination with flange 314 on top surface 312*a* as described previously. Optionally, tray 400 may also be configured with slots (not shown) which could align with slots 308 in disc 300 such that additional vertical space is created for inserting picks of larger sizes and without abutting the tray top surface 402*a* of FIG. 4A described further below. Such configuration may also allow the thickness of disc 300 to be reduced, thereby saving on material and resulting in a lower profile for the assembled apparatus 100, or may also reduce the need for utilizing flanges 314. Voids 316 are optionally provided between radially projecting slots 308 to further reduce the amount of material, and thus the weight and cost of producing disc 300.

Figure 3C:
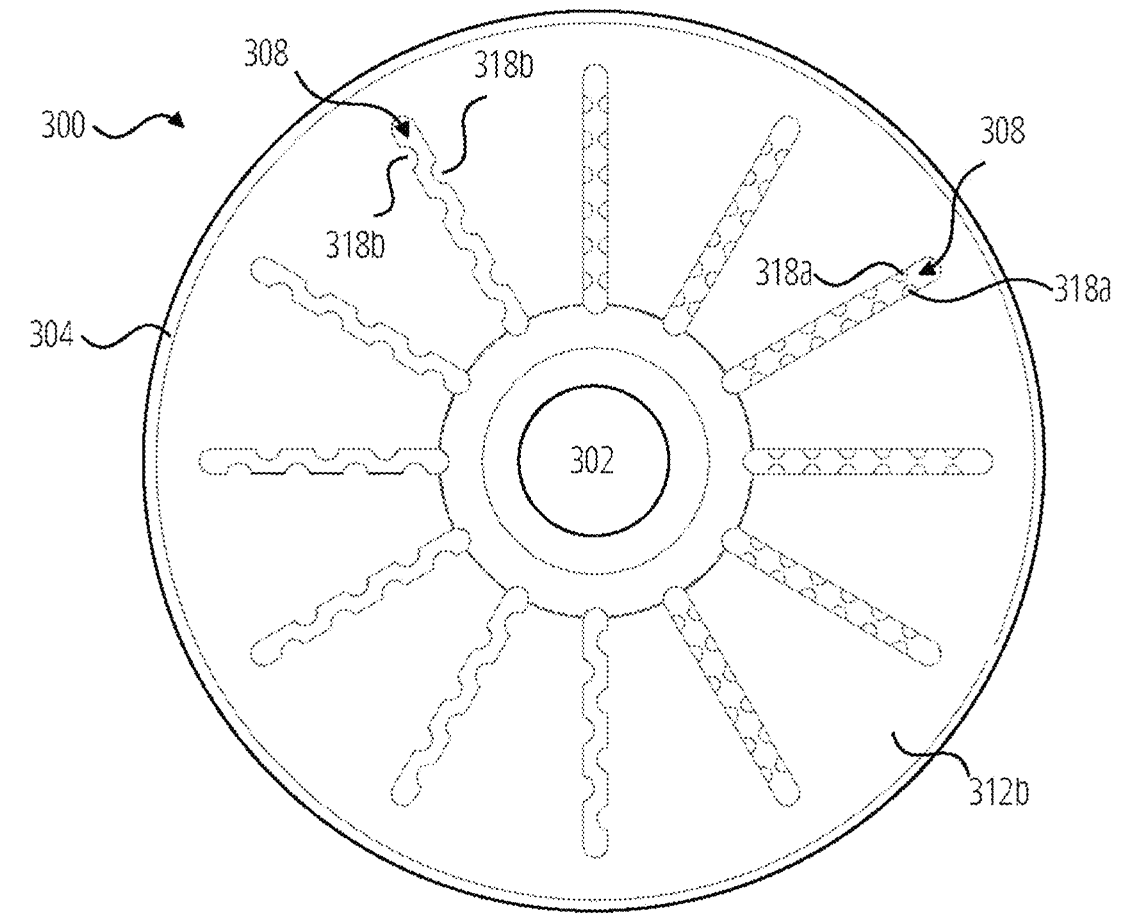
FIG. 3C is a simplified bottom view of a disc according to an aspect of the present disclosure, showing various retention features in the disc.

FIG. 3C is a simplified bottom view of disc 300, showing bottom surface 312*b* and illustrating alternative examples of pick retainers 310, including opposing pairs of pick retainers 318*a* and offset pairs of pick retainers 318*b*. Opposing pairs of pick retainers 318*a* function to create a direct opposing retention force against each side of a pick 320 to hold and secure it in place, which may be ideal for creating higher holding force and friction for thinner picks or picks having a smooth surface, whereas offset pairs of pick retainers 318*b* may be used for thicker picks or picks having a textured surface and thus requiring less retention force. Disc 300 may comprise slots 308 having both types of pick retainers 310 (offset pairs and opposing pairs), thereby accommodating more types of picks to be held within the same disc 300 or apparatus 100. In one aspect, slots 308 with grips are configured to securely hold picks 320 having a thickness of about 0.66 mm to about 2 mm. Further, the top surface 312*a* of disc 300 may optionally comprise markings or graphics (not shown) to allow a user to visually differentiate between the different types of pick retainers 310 configured for picks having different thicknesses, geometries, or other features, for example.

Figure 3D:
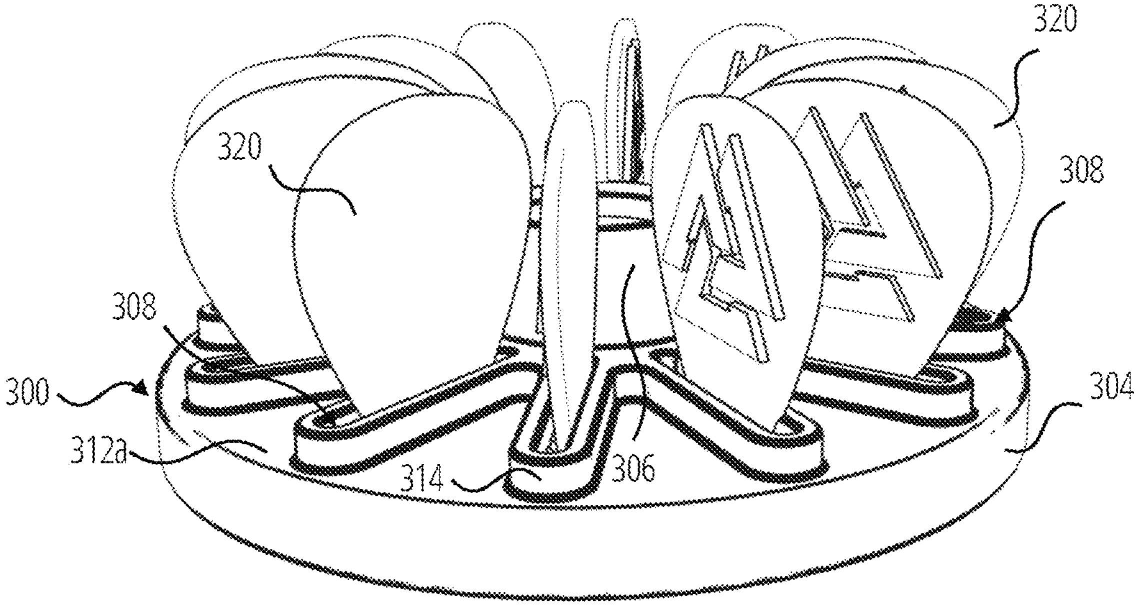
FIG. 3D is a top perspective view of a disc showing an example of holding and organizing musical instrument picks according to an aspect of the present disclosure.

FIG. 3D is a top perspective view of disc 300, showing an example of picks 320 being held in slots 308. In this example, disc 300 may function as a stand-alone solution independent of assembled apparatus 100 for storing, organizing, displaying and retrieving picks 320 via a one-handed operation (as described in more detail with reference to FIGS. 9A-9C). Disc 300 may sit directly on a surface, such as a table or amplifier top, for easy visual identification and one-handed retrieval of picks 320 by a user according to their needs on an instrument. Alternatively, disc 300 may be provided as part of assembled apparatus 100, but be configured for easy removal for independent use as shown. For example, if disc 300 is press-fit onto tray 400 (of FIG. 4A and FIG. 4B), the press-fit attachment may be designed with looser tolerances to allow for easy disengagement of disc 300 from tray 400, and subsequent re-engagement for use in apparatus 100. If disc 300 is sold or provided separate from apparatus 100, a user may own multiple discs 300 for storing and organizing picks 320, each of which can be easily swapped out of apparatus 100.

Figure 4A:
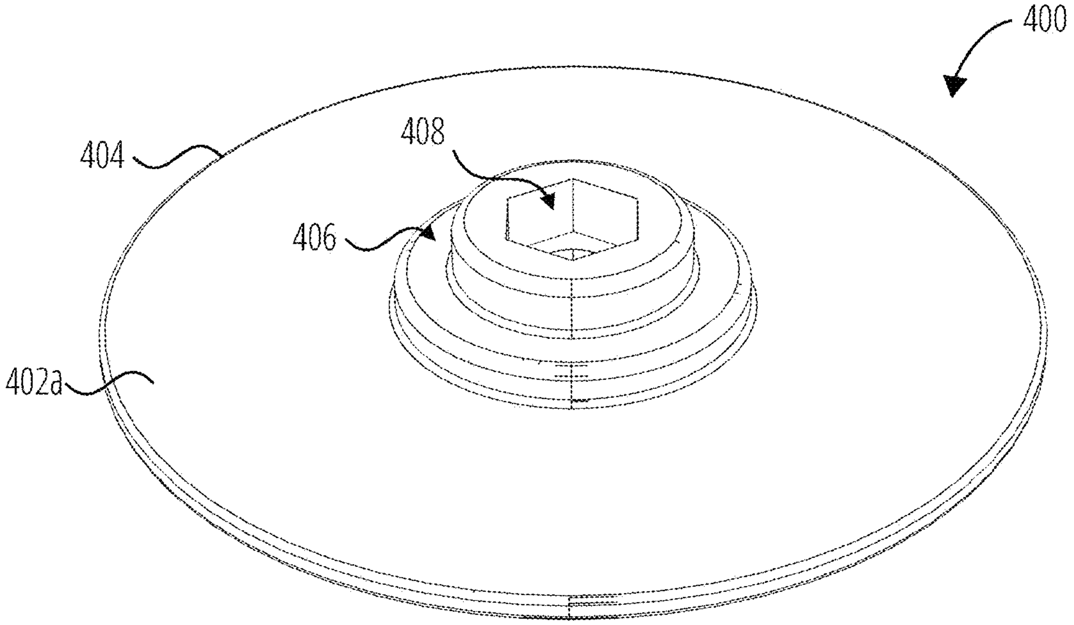
FIG. 4A is a top perspective view of a tray according to an aspect of the present disclosure.
Figure 4B:
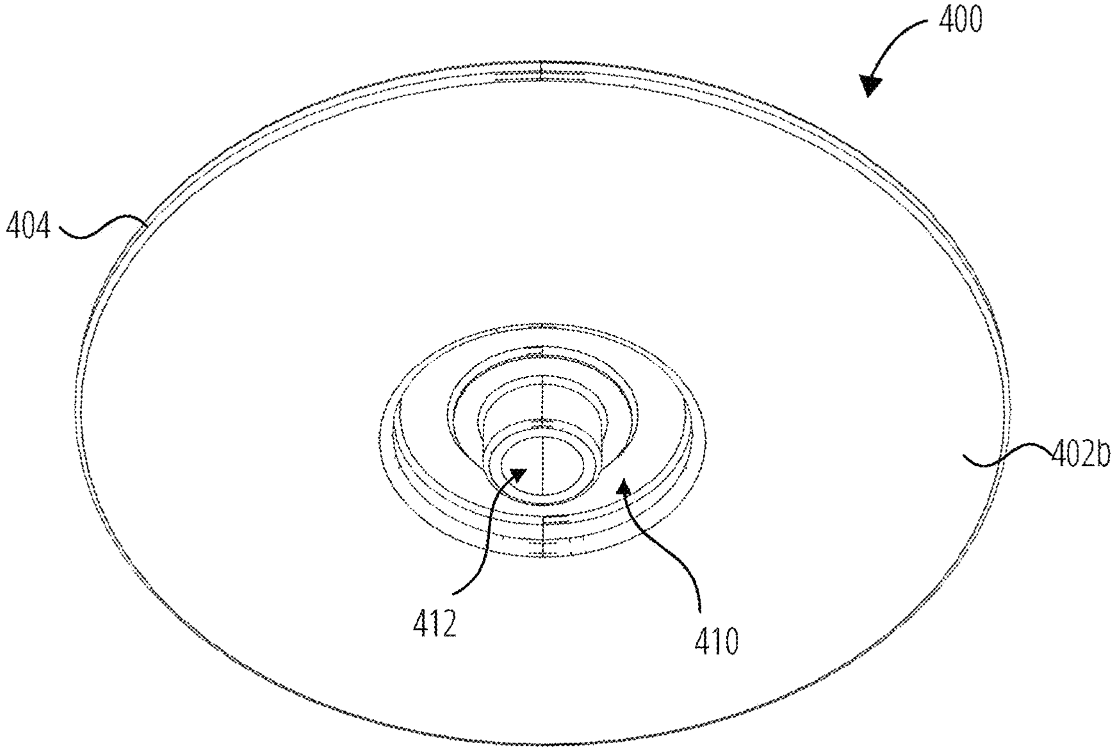
FIG. 4B is a bottom perspective view of a tray according to an aspect of the present disclosure.

FIG. 4A and FIG. 4B are a top perspective view and bottom perspective view, respectively, of tray 400, showing tray top surface 402*a*, tray bottom surface 402*b*, a tray circumference 404, a tray protrusion 406, a nut housing 408, a bearing housing 410, and a shaft housing 412. The diameter of tray 400 may be substantially the same as the diameter of disc 300, and functions to support disc 300 in apparatus 100. This may be particularly advantageous when disc 300 is made of a soft elastomer, which may require structural support to prevent deformity. Further, tray 400 functions in apparatus 100 to communicate with or otherwise attach to bearing subassembly 700, explained further with reference to FIG. 2 and FIG. 7A and FIG. 7B, which in turn is connected to base 500 to enable tray 400 to rotate relative to base 500. Since disc 300 is supported on tray 400, the rotation of tray 400 also functions to rotate disc 300. Alternatively, disc 300 may be made of a harder material that does not require structural support, and that can directly attach to bearing subassembly 700, in which case tray 400 may be optional in the construction of apparatus 100.

Tray protrusion 406 extends from center of tray 400 tray top surface 402*a*, and is configured to press-fit into the disc cavity 322 (shown with reference to FIG. 3B). However, as mentioned previously, other means of attachment are possible, including use of adhesives or other fasteners. Tray protrusion 406 may have a stepped geometry as shown that matches the stepped geometry of disc cavity 322 and tolerances that facilitate a secure press-fit engagement of disc 300 to tray 400.

Centered in tray protrusion 406 is nut housing 408, which is sized to receive a nut 708 (shown with reference to FIG. 7A and FIG. 7B) from bearing subassembly 700. Nut 708 can then attach to shaft 702 which may comprise a screw body 710*b* (shown with reference to FIG. 7A and FIG. 7B).

Figure 7A:
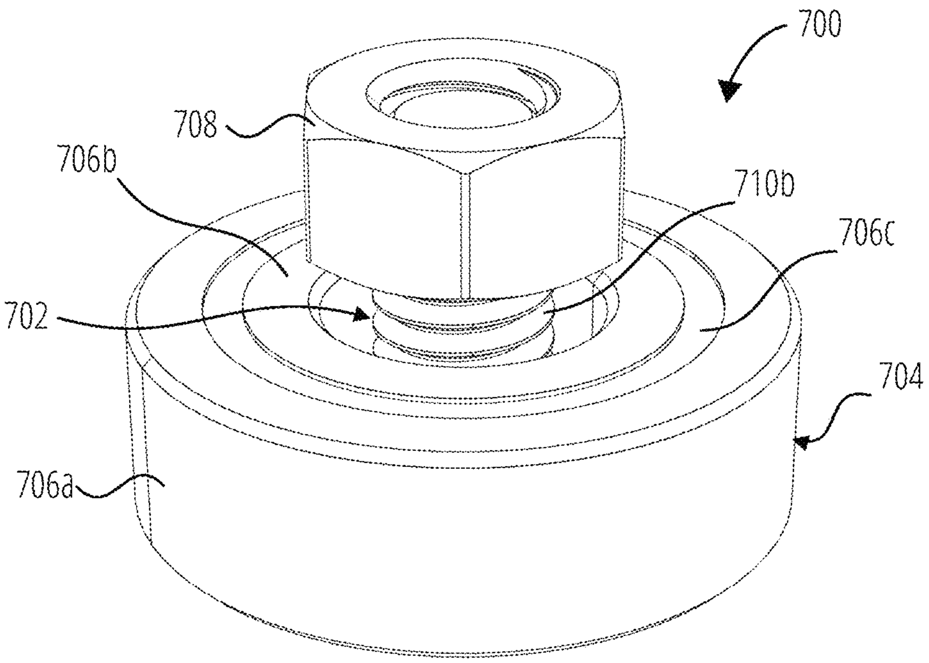
FIG. 7A is a top perspective view of a bearing subassembly according to an aspect of the present disclosure.
Figure 7B:
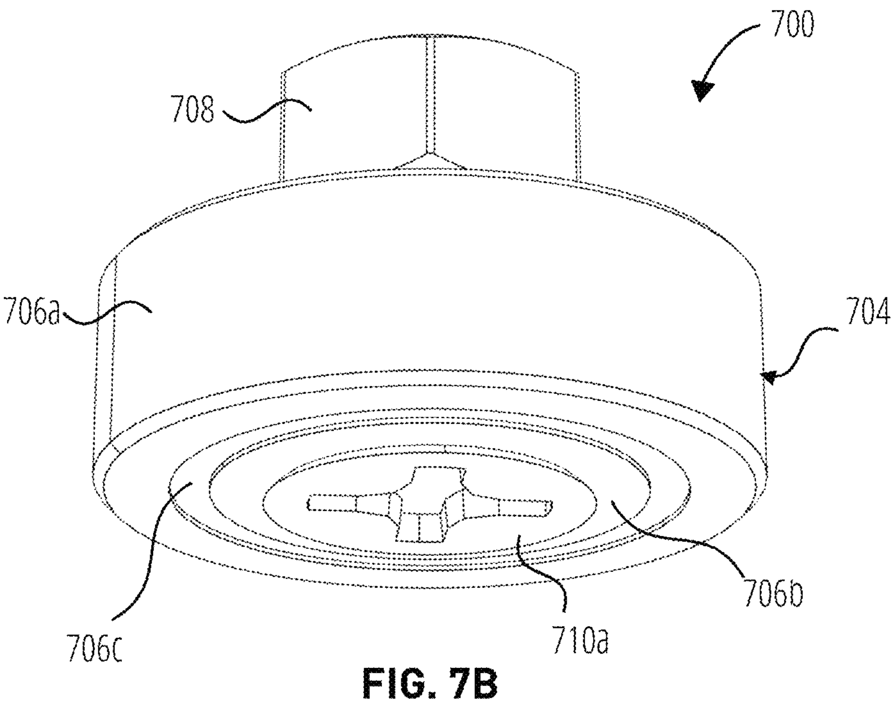
FIG. 7B is a bottom perspective view of a bearing subassembly according to an aspect of the present disclosure.

As shown in FIG. 4B, bearing housing 410 is sized to accommodate the body of bearing 704 and shaft housing 412 is sized to accommodate shaft 702 therethrough, as described further with reference to bearing subassembly 700 in FIG. 7A and FIG. 7B. Bearing housing 410 is sized and configured to enable free rotation of the inner ring 706*b* of bearing 704 and without contact with or frictional resistance from the tray bottom surface 402*b* inside bearing housing 410, thereby enabling free rotation of tray 400 relative to base 500.

Figure 5A:
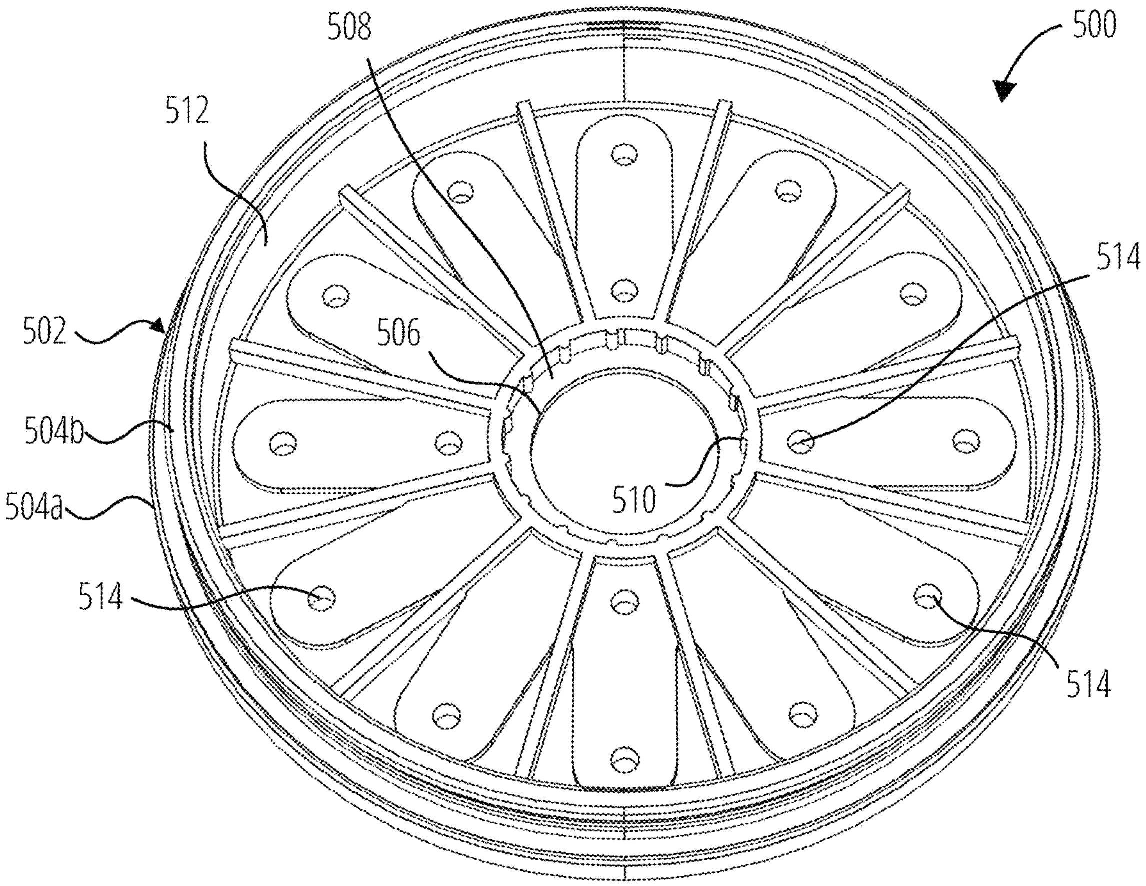
FIG. 5A is a top perspective view of a base according to an aspect of the present disclosure.
Figure 5B:
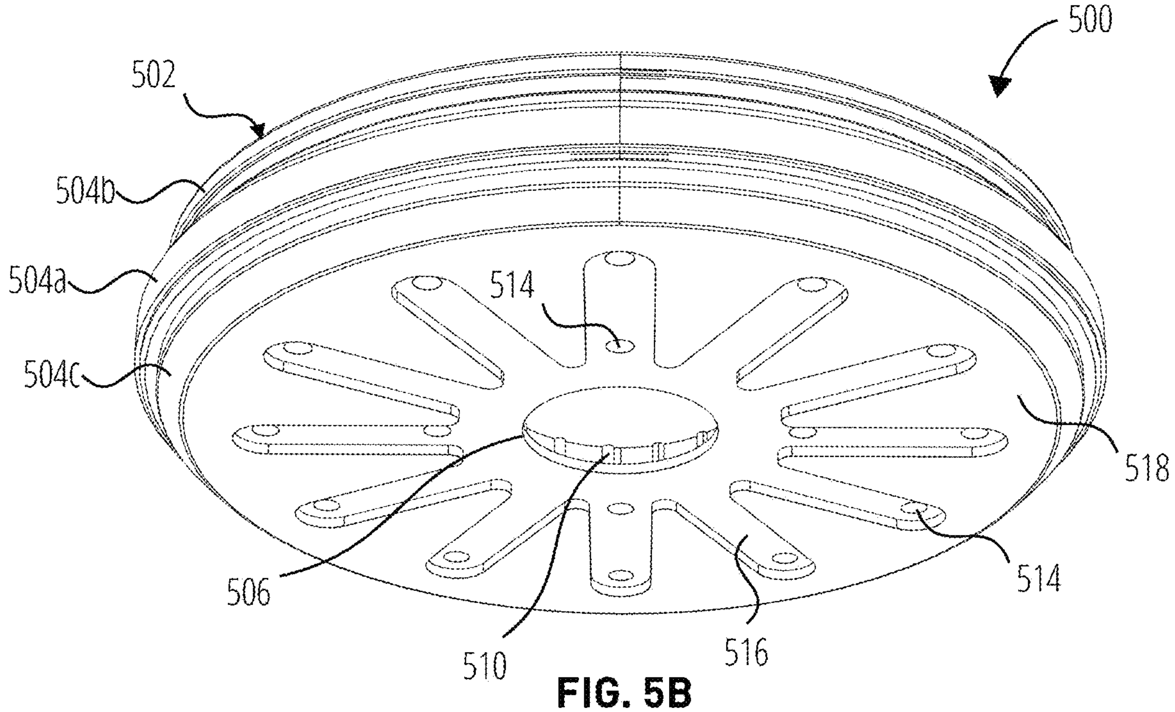
FIG. 5B is a bottom perspective view of a base according to an aspect of the present disclosure.

FIG. 5A and FIG. 5B are a top and bottom perspective view, respectively, of base 500, showing rim 502, flange circumference 504*a*, top circumference 504*b*, bottom circumference 504*c*, opening 506, bearing housing base 508, retention features 510, wall 512, foot retention holes 514, and foot housing 516.

Bearing 704 of bearing subassembly 700 (shown with reference to FIG. 7A and FIG. 7B) may be press-fit into bearing housing base 508 such that the outer ring 706*a* is held in place via retention features 510, while the inner ring 706*b* is allowed to rotate freely. However, other suitable means of attachment may be used.

Rim 502 rises from base bottom surface 518 with stepped features of varying circumferences, and to form wall 512. Flange circumference 504*a* has the largest circumference or outer diameter, and projects around the outside of wall 512 of the base 500. Above the flange circumference 504*a* is a top circumference 504*b* and below is a bottom circumference 504*c*, each of the top and bottom circumference being smaller than the flange circumference 504*a*, and of substantially the same diameter to one another. The top circumferences 504*b* and bottom circumferences 504*c* are both sized to snugly fit within an inner circumference of lid 200 to enable a press-fit of the lid either above or below the flange circumference 504*a*, thereby enabling the lid 200 to serve as either a cover for the top of apparatus 100 (as shown with reference to FIG. 1A, FIG. 1B and FIG. 8), or as a stand for apparatus 100 (as shown with reference to FIG. 9A to FIG. 9C). Alternatively, top circumference 504*b* and/or bottom circumference 504*c* may be configured with threads along with the inside circumference of lid 200 to engage lid 200 in a screw fit arrangement. In another aspect, flange circumference 504*a* may be provided with a recess to fit an o-ring into the outermost surface of the flange, to enable a friction fit with lid 200 that is waterproof. Snap fit features may also be introduced for securing lid 200 to either the top or bottom of base 500.

When bearing subassembly 700 is used to attached tray 400 to base 500, shaft 702 is of a length to ensure that tray bottom surface 402*b* (of FIG. 4B) is free from the inside surfaces of base 500 to avoid friction of the tray 400 with the base 500 and enable free spinning rotation. The tray circumference 404 (of FIG. 4A and FIG. 4B) along with disc circumference 304 (of FIG. 3A and FIG. 3B) are both of a size or maximum diameter that is smaller than an inside circumference or diameter of wall 512 to enable tray 400 and disc 300 to spin freely within base 500 and without friction or contact with wall 512.

Figure 6A:
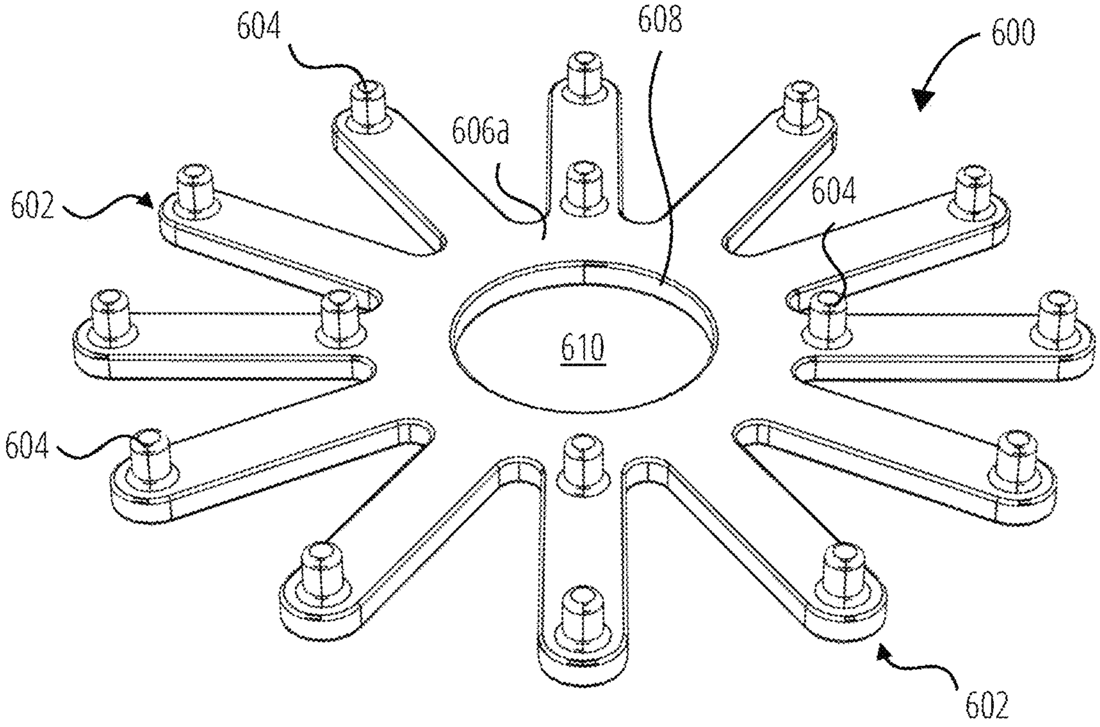
FIG. 6A is a top perspective view of a foot according to an aspect of the present disclosure.
Figure 6B:
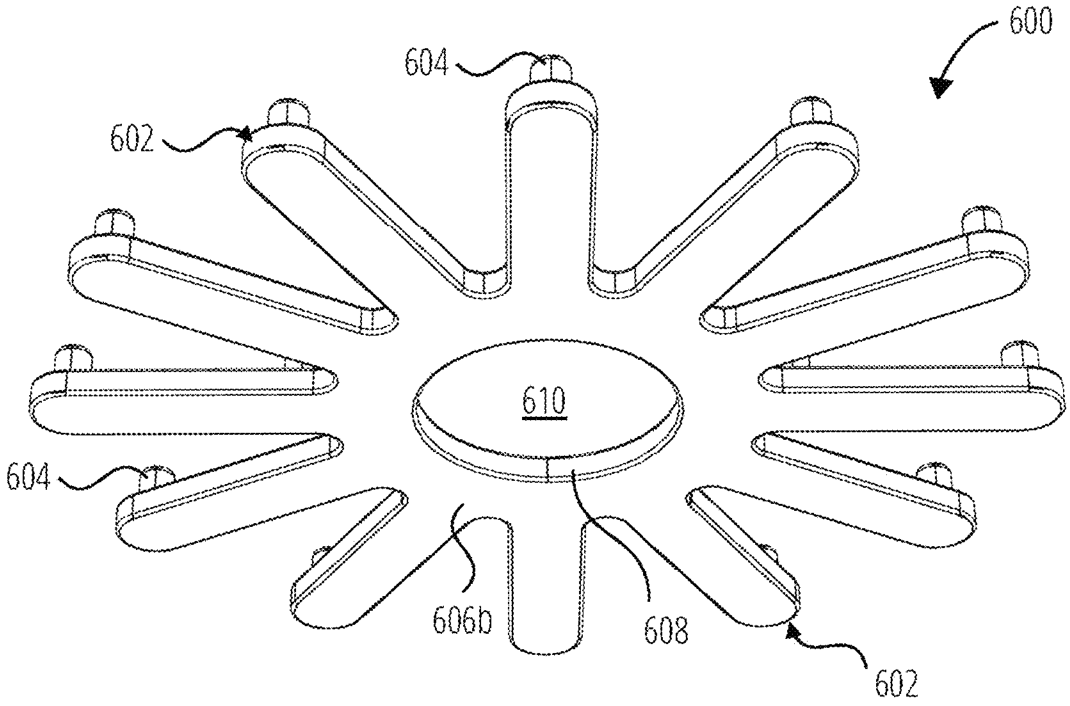
FIG. 6B is a bottom perspective view of a foot according to an aspect of the present disclosure.

As shown in FIG. 5B, foot housing 516 recedes from base bottom surface 518 to receive foot 600 (described further in reference to FIG. 6A and FIG. 6B). Base 500 includes foot retention holes 514 extending through the base bottom surface 518 to the inside of base 500. Further, opening 506 is provided to enable assembly of the bearing subassembly 700 and allow access to screw head 710*a*, as well as to enable free and frictionless rotation of inner ring 706*b* of bearing 704 (described further with reference to FIG. 7A and FIG. 7B). Further, when apparatus 100 is fully assembled, inner ring 706*b* of bearing 704 may be elevated from a surface upon which base 500 and foot 600 are rested, thereby avoiding contact of the inner ring 706*b* with such surface to further enable free and unimpeded rotation. Opening 506 is coaxial with shaft housing 412 of tray 400 (FIG. 4B), and both are coaxial with disc center 302 of disc 300 (FIG. 3B) to ensure rotation of disc 300 and tray 400 is smooth and without disk wobble, runout or eccentricity when apparatus 100 is assembled via bearing subassembly 700.

FIG. 6A and FIG. 6B are a top and bottom perspective view, respectively, of foot 600, showing arms 602, pegs 604, foot top surface 606*a*, foot bottom surface 606*b*, opening 608, and foot center 610. Foot 600 is configured to fit inside of foot housing 516 of base 500 (FIG. 5B), and attachment may be secured via pegs 604 extending upwardly from foot top surface 606*a* to fit through foot retention holes 514 in base 500. Foot 600 is provided with a plurality of arms 602 projecting radially from the foot center 610, and preferably comprises the same number of arms 602 as there are slots 308 in disc 300, though any number of arms 602 may be arranged. Opening 608 around foot center 610 is coaxial with opening 506 of base 500 (FIG. 5B), shaft housing 412 of tray 400 (FIG. 4B), and disc center 302 of disc 300 (FIG. 3B), thus opening 608 also services to facilitate free and stable rotation of inner ring 706*b* of bearing 704 and components attached thereto, as well as provide access to bearing subassembly 700 screw head 710*a*.

Figure 8:
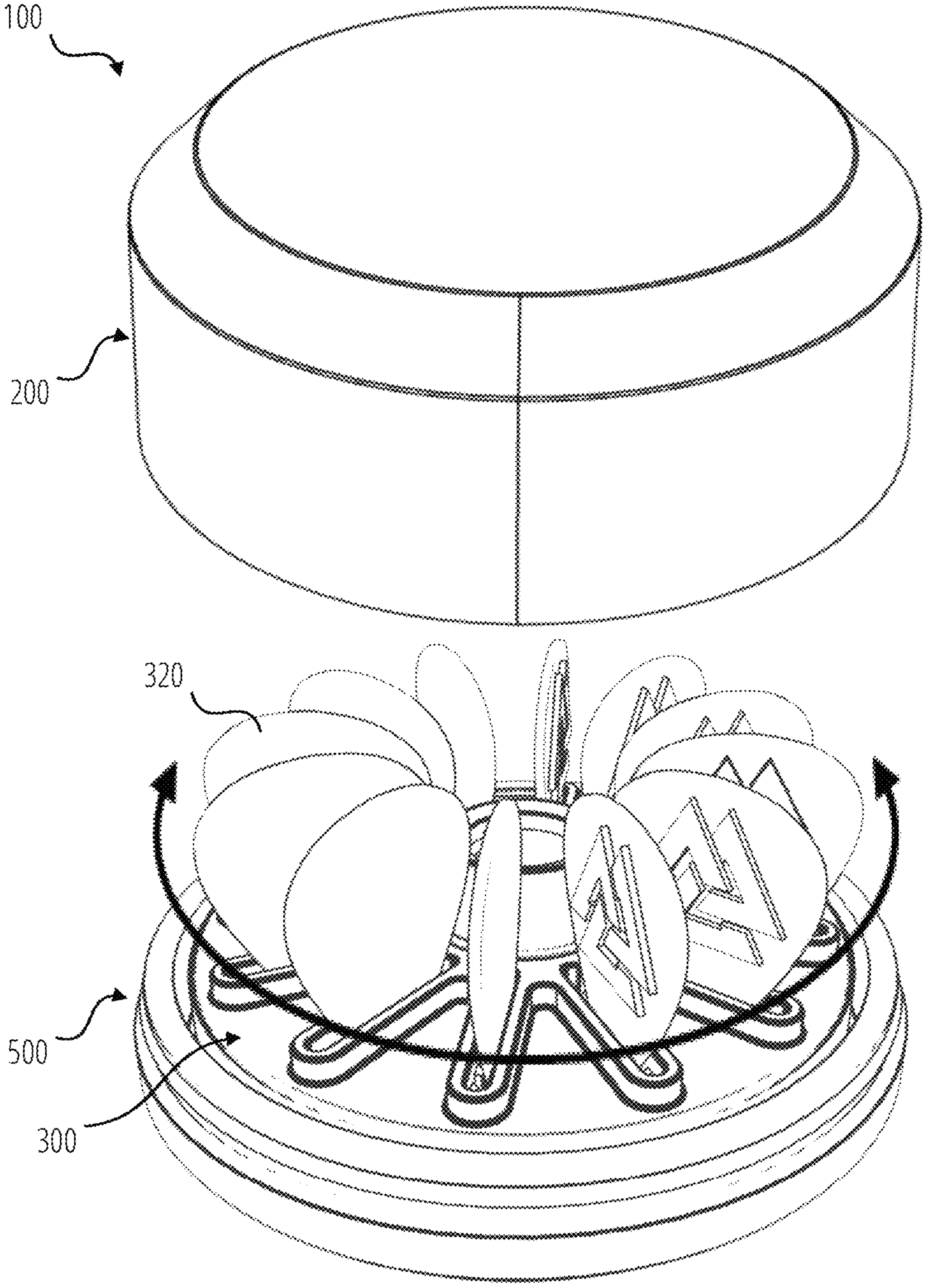
FIG. 8 is a top perspective view of the assembled apparatus such as shown in FIG. 1A and FIG. 1B, showing the lid removed and the rotational feature of the disc.

Foot bottom surface 606*b* serves to stabilize base 500 against a resting surface, such as a table top or amplifier top, during use of apparatus 100, including against the rotational motion of disc 300 and tray 400 (as described further with reference to FIG. 8).

FIG. 7A and FIG. 7B are a top and bottom perspective view, respectively, of bearing subassembly 700, showing shaft 702, bearing 704, outer ring 706*a*, inner ring 706*b*, roller 706*c*, nut 708, screw head 710*a*, and screw body 710*b*. As described with reference to the previous Figures, bearing subassembly 700 functions to attach base 500 to tray 400 (and thereby disc 300) in a manner which allows the free rotational motion of tray 400 and disc 300 versus base 500. Bearing 704 is secured into bearing housing base 508 of base 500 via press-fit, for example, and is housed within bearing housing 410 of tray 400 when apparatus 100 is assembled. Shaft 702 is attached to and extends upwardly from the rotatable inner ring 706*b* of bearing 704, upward through shaft housing 412 of tray 400, and physically connects to tray 400 via nut 708 in nut housing 408 for example. However, tray 400 may also be configured to receive a press-fit or adhesive connection of shaft 702 or other suitable attachment to avoid requiring use of nut 708.

Inner ring 706*b* is freely rotatable because outer ring 706*a* is statically secured to bearing housing base 508 via retention features 510, while ample space is provided around inner ring 706*b* to prevent any frictional engagement with surrounding features as described previously. In the example shown, shaft 702 may comprise a screw body 710*b*, and screw head 710*a* is used to secure shaft 702 to inner ring 706*b* of bearing 704 while screw body 710*b* is screwed into nut 708 held within tray 400 nut housing 408. Since screw head 710*a* is evenly tapered, it will be self centering when screwed within inner ring 706*b* to ensure centering of shaft 702 within the bearing 704. Roller 706*c* is provided between outer ring 706*a* and inner ring 706*b* to enable rotational motion of inner ring 706*b* as is customary with common bearing construction and function.

Bearing 704 may comprise a radial bearing, such as a deep groove ball bearing, angular contact ball bearing, cylindrical roller bearing, tapered roller bearing, or spherical roller bearing, or may comprise a thrust bearing such as a ball thrust bearing or roller thrust bearing, as non-limiting examples. Other suitable mechanisms may be used to enable rotational motion, ideally with low friction.

FIG. 8 is a top perspective view of assembled apparatus 100 and its rotational functionality. When lid 200 is removed, a user may push on any one of picks 320 or an exposed portion of disc 300 such that disc 300 rotates freely in either direction, thereby enabling quicker selection of a desired pick 320 for retrieval from apparatus 100. In contrast with prior art systems and methods, a user is able to clearly see and identify all of the picks 320 stored in apparatus 100, whether with the lid 200 engaged (in case of a transparent lid), or with the lid off as shown in FIG. 8. Once a pick 320 is identified for use, the user can rotate disc 300 relative to base 500 until the desired pick 320 is within easier reach of the user, and then retrieve that pick 320 using a one-handed operation as described further with reference to FIG. 9A to FIG. 9C below.

Figure 9A:
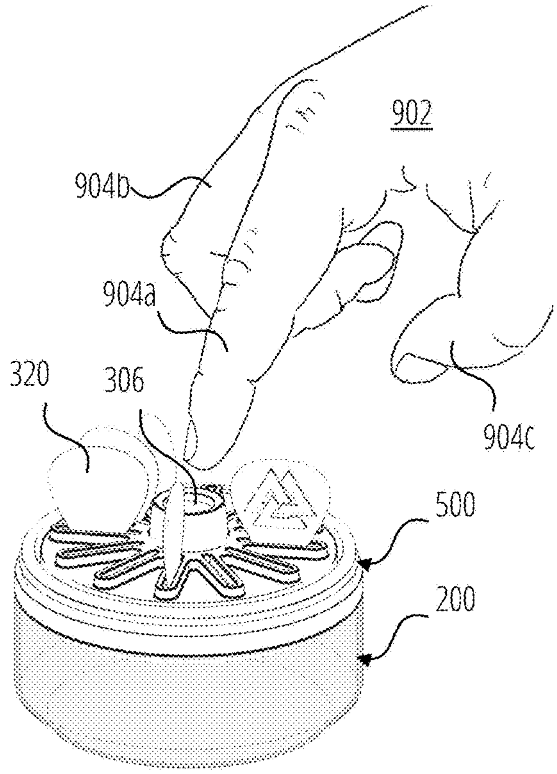
FIG. 9A, FIG. 9B and FIG. 9C are top perspective views of an assembled apparatus with the lid functioning as a stand for the base, and illustrating a method of using the apparatus to retrieve a pick from the disc.
Figure 9B:
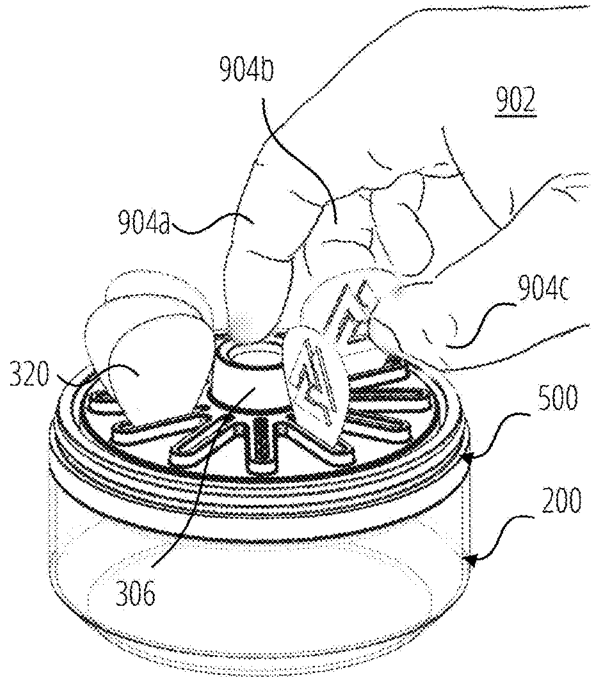
Figure 9C:
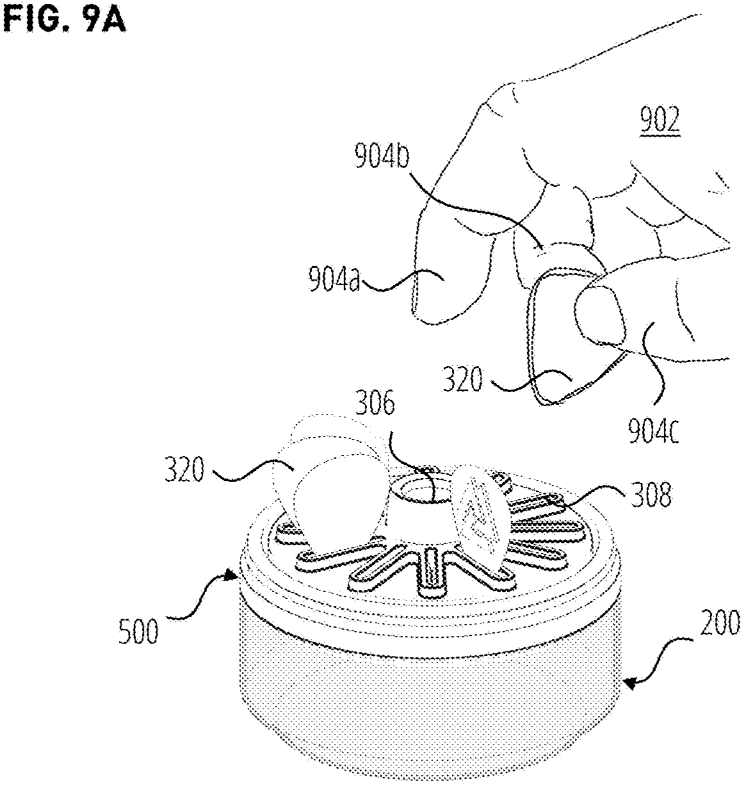

FIG. 9A, FIG. 9B and FIG. 9C are top perspective views of a method of using apparatus 100 to identify and retrieve a pick 320, further showing a user's hand 902, index finger 904*a*, middle finger 904*b*, and thumb 904*c*. Further, these Figures show lid 200 functioning as an optional stand for base 500 as described previously. When lid 200 is configured to attach to the underside of base 500 as a stand, it is easier to keep lid 200 from being misplaced or lost. In such configuration, the top of lid 200 may optionally comprise a frictional coating or material to engage a table or other surface such that apparatus 100 is stable during rotation of disc 300.

In FIG. 9A, after a user has rotated disc 300 to identify a pick 320 for retrieval, the user extends their index finger 904*a* to make contact with the apex of protrusion 306.

As shown in FIG. 9B, once the index finger 904*a* has made contact with protrusion 306, the middle finger 904*b* and thumb 904*c* may grab the desired pick 320 from opposing sides, while the index finger 904*a* can press against protrusion 306 for leverage to overcome any retention force of the pick 320 held within slot 308.

As shown in FIG. 9C, the pick 320 may then be retrieved from the slot 308 with a single hand. This method is also compatible with disc 300 used as a stand-alone pick 320 holder as described with reference to FIG. 3D.

In another aspect, a user may fill slots 308 with a diverse assortment of picks, and then rapidly spin disc 300. When the user stops the spinning motion at a random pick 320, the user may then retrieve that pick 320 and see how it sounds with their stringed instrument. In such manner, apparatus 100 may be used to enable random experimentation with various picks, or as part of a game played between users to see how various picks affect their playing abilities and sounds achieved on their respective stringed instruments.

Accordingly, the apparatus 100, including disc 300 separate from or as part of the assembled apparatus 100, provides an improved method for holding, organizing, identifying, and retrieving picks. Picks 320 may be easily retrieved from apparatus 100 using the rotational motion of disc 300 relative to base 500 as well as the simple and convenient one-handed operation enabled by the features of the present disclosure. Further, apparatus 100 as well as disc 300 provide an attractive system for displaying picks 320, including but not limited to guitar picks, and in music stores or for personal use. Apparatus 100 also provides a conveniently sized and secure holder for transporting picks 320 in a bag for transport, including a gig bag or guitar case, and in a manner that keeps the picks organized and held securely despite being jostled around.

While the invention has been described with reference to exemplary examples, embodiments or aspects, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments, examples or aspects herein disclosed, but that the invention will include all embodiments falling within the scope of the appended claims.

The invention claimed is:

1. An apparatus for holding picks for a musical instrument comprises:

a disc comprising a plurality of radially projecting slots, each slot configured to receive and hold a musical instrument pick.

2. The apparatus of claim 1, wherein the disc further comprises a protrusion at a center of the disc configured to be pushed by a finger of a user of the apparatus to retrieve a pick from each slot.

3. The apparatus of claim 1, wherein at least one of the plurality of radially projecting slots comprises grips configured to apply pressure on a guitar pick.

4. The apparatus of claim 3, wherein the grips comprise opposing pairs of pick retainers.

5. The apparatus of claim 3, wherein the grips comprise offset pairs of pick retainers.

6. The apparatus of claim 1, wherein each of the plurality of radially projecting slots are equidistantly spaced.

7. The apparatus of claim 1, wherein at least one of the plurality of radially projecting slots extends completely from the top to the bottom of the disc.

8. The apparatus of claim 1, wherein the disc comprises an elastomer.

9. The apparatus of claim 1, further comprising a base, and wherein the disc is configured to rotate relative to the base.

10. The apparatus of claim 9, further comprising a tray for supporting the bottom of the disc.

11. The apparatus of claim 10, further comprising a bearing in communication with the base and the tray to enable rotation of the tray and disc together relative to the base.

12. The apparatus of claim 11, wherein the bearing is attached to the base and communicates with the tray via a shaft extending from the bearing to enable rotation of the tray and disc together relative to the base.

13. The apparatus of claim 11, wherein the bearing comprises a radial bearing or a thrust bearing.

14. The apparatus of claim 10, wherein the tray comprises at least one slot that is coaxial with at least one of the plurality of radially projecting slots in the disc.

15. The apparatus of claim 9, wherein the base comprises a foot for frictionally engaging a surface to prevent movement of the base during rotation of the disc.

16. The apparatus of claim 9, further comprising a lid configured to be secured to a top of the base to cover the disc.

17. The apparatus of claim 16, wherein the lid is further configured to be secured to a bottom of the base as a stand for the base and the disc.

18. The apparatus of claim 16, wherein the lid is transparent enough to allow visual identification of picks held within slots of the disc.

19. An apparatus for holding picks for a musical instrument comprises:

a disc comprising a plurality of radially projecting slots, each slot configured to receive and hold a musical instrument pick, the disc further comprising a protrusion configured to be pushed by a finger of a user of the apparatus to retrieve a pick from each of the slots.

20. An apparatus for holding picks for a musical instrument comprises:

a disc comprising a plurality of radially projecting slots, each slot configured to receive and hold a musical instrument pick; and a base, wherein the disc is configured to rotate relative to the base.

* * * * *